United States Patent [19]
Bucek et al.

[11] 3,932,771
[45] Jan. 13, 1976

[54] CONTROL FOR THREE PHASE A.C. MOTOR

[75] Inventors: Jiri B. Bucek, State College; James R. Shultz, York, both of Pa.

[73] Assignee: Fincor, Inc., York, Pa.

[22] Filed: Jan. 30, 1974

[21] Appl. No.: 438,072

Related U.S. Application Data

[62] Division of Ser. No. 238,141, March 27, 1972, Pat. No. 3,826,928, which is a division of Ser. No. 62,869, Aug. 11, 1970, Pat. No. 3,678,355.

[52] U.S. Cl. ........ 307/265; 307/252 N; 307/252 Q; 307/269; 323/22 SC; 323/24
[51] Int. Cl.² .......................................... H03K 5/04
[58] Field of Search ........... 318/311, 312, 315, 345, 318/346, 227; 307/261, 262, 265, 252 N, 307/252 B, 269; 323/22 SC, 24

[56] References Cited
UNITED STATES PATENTS

| | | | |
|---|---|---|---|
| 3,336,531 | 8/1967 | Yamada | 307/252 N |
| 3,564,388 | 2/1971 | Nolf | 323/22 SC |
| 3,601,708 | 8/1971 | Stempler et al. | 307/232 X |

*Primary Examiner*—John Zazworsky

[57] ABSTRACT

A solid state trigger circuit provides variable period output signals within a timed sequence of signals for controlling conduction angle firing of thyratron type switching devices in an A.C. phase line. A bi-stable multivibrator receives timing signals derived from the alternating current in the phase line which are out of phase with each other. The timing signals oscillate the multivibrator at a desired timing rate to produce an output of the multivibrator which has voltage transition spikes at the beginning of each positive circle of the timing signals. A saw tooth wave form with a linear voltage input control signal indicative of a desired time period pulse width provides a square wave trigger output signal with signal pulse periods equal to the desired pulse width.

2 Claims, 3 Drawing Figures

3,932,771

CONTROL FOR THREE PHASE A.C. MOTOR

This is a division, of application Ser. No. 238,141, filed Mar. 27, 1972, now U.S. Pat. No. 3,826,928, which was a division of application Ser. No. 62,869, filed Aug. 11, 1970, now U.S. Pat. No. 3,678,355, which are both incorporated by reference herein.

BACKGROUND OF THE INVENTION

As disclosed by U.S. Pat. Nos. 3,678,355 and 3,826,928, it is desirable to provide an A.C. motor control using solid state technique to acquire a tight, sophisticated control of motor acceleration, deceleration and programmed speed which, to all intents and purposes, eliminates lag in motor response to change speed signals in the control system. The desired result is instantaneous response in motor power or electrical braking, such as could be advantageously utilized in elevator motors.

The control circuit therefore provides motor directional and speed reference signals as voltages shaped into a smooth linear ramp summed with a feedback signal which is responsive to motor speed and direction. It is desirable for the amplitude and polarity of the amplified error to control the current flow and reversing of phase rotation, respectively, in at least two of the three phase motor inputs through fast responding, solid state trigger circuits controlling thyristor switches. Motor direction and speed conditions are sensed by a special A.C. tachometer and feedback circuit which feeds into the feed control circuit, as described above. The A.C. tachometer with a direction and speed sensing circuit is the subject matter of and is fully disclosed in a copending application Ser. No. 875,193, filed Nov. 10, 1969, now U.S. Pat. No. 3,614,616.

SUMMARY

Accordingly, a primary object of the present invention resides in providing a universal solid state trigger circuit which provides positive going output trigger pulses for turning on an independent thyristor for each half cycle of an alternating phase load channel. The trigger circuit includes a bi-stable, multi-vibrator circuit whose "set" and "reset" inputs are controlled by timing pulses derived from each half-cycle of the phase input to the controlled phase channel Speed signals are compared, shaped and via AND gates and amplifier circuits provide cycle chopping trigger output pulses for each one-half cycle to control current flow through thyristor circuits during each half-cycle of an input phase.

DETAILED DESCRIPTION OF THE PREFERRED EMBODIMENT

The invention of U.S. Pat. Nos. 3,826,928 and 3,678,355 is described as incorporated in a control system for use with a three phase A.C. motor elevator drive and eliminates the motor generator set used to convert A.C. power to D.C. power for operating a D.C. elevator drive as is used in most high speed elevators. It is to be understood that the system can be used to control other three phase A.C. motor applications.

The control system for the A.C. motor drive involves starting, running and stopping the elevator lifting motor in a manner which avoids the discomfort of abrupt transitions in speed. The motor control will be described primarily with reference to the block diagram seen in FIG. 1 although specific references will, at times, be made to the triggering circuitry in the schematic drawing FIG. 2 and the timing chart of FIG. 3. A more detailed understanding of the entire circuitry for the motor control is provided in U.S. Pat. Nos. 3,678,355 and 3,826,928 as mentioned hereinabove.

Figure 1:
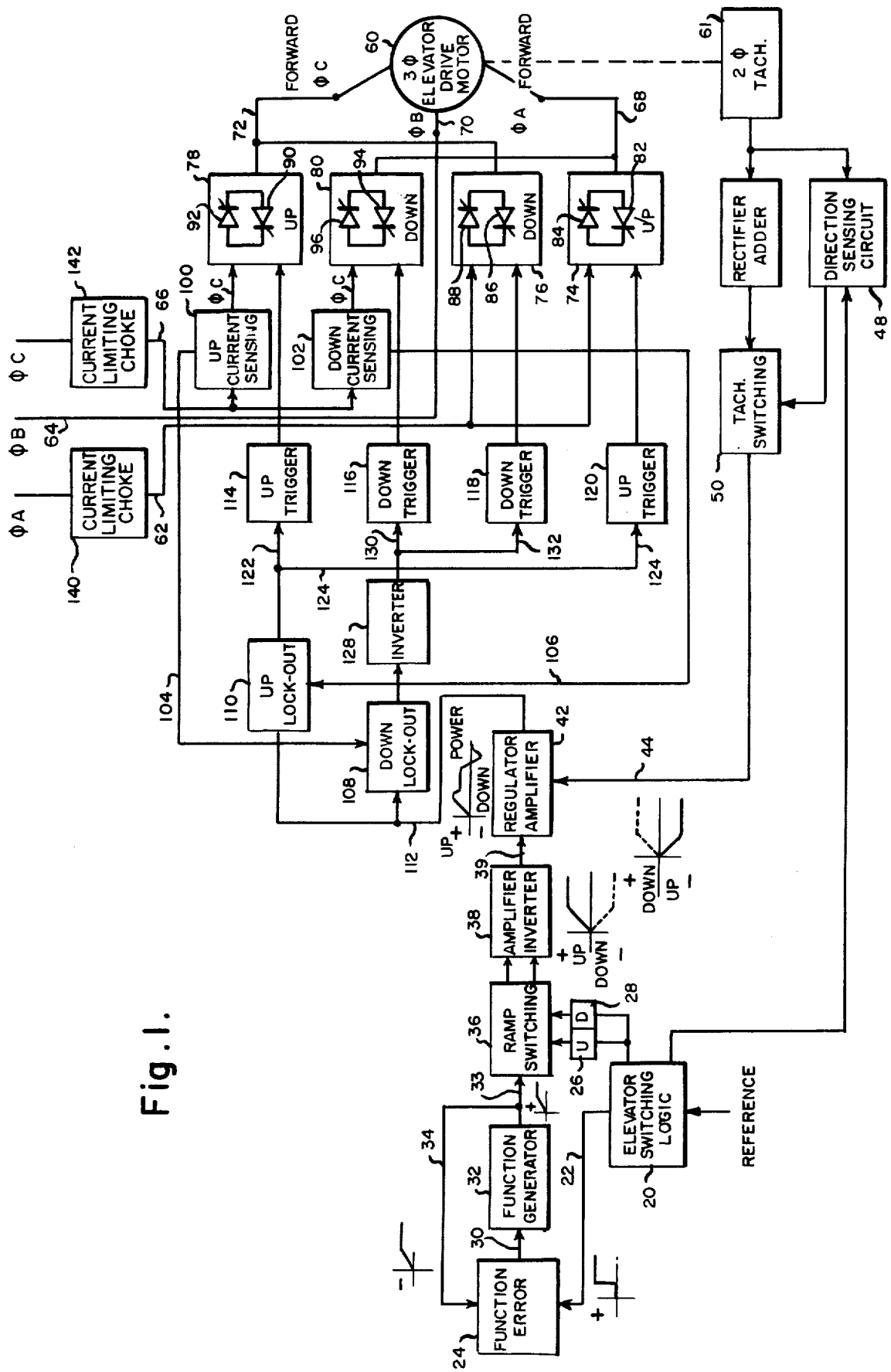
FIG. 1 is a block diagram illustrating a control circuit for a three phase A.C. elevator motor in which the present invention may be utilized.

Referring to FIG. 1, an elevator run will be initiated by the supervisory system by depressing a control button (not shown) in the elevator car or at a landing. This actuates the elevator switching logic 20 which produces a predetermined D.C. voltage signal on its output 22, which is connected to and provides an input to the function generator error amplifier 24. The amplitude of the voltage output signal developed by switching logic control 20 will determine the maximum speed to which the car can accelerate during the desired run and the slower levelling speed as the car approaches the selected landing. For multi-floor runs the elevator logic signal will have an amplitude which permits the elevator to accelerate to its highest speed. For single floor run the control voltage amplitude will be less, permitting acceleration to a fraction of the highest speed. The supervisory control also provides an output signal at other predetermined levels indicative of approach or levelling speeds; also provides a signal indicative of zero speed or stop condition and which applies and releases the elevator floor holding brake; and also provides via, up and down relays 26 and 28, a direction control for elevator drive.

The output on line 30 from the function error amplifier 24 is integrated in a function generator 32 at an adjustable preset rate. As the function generator signal on output 33 integrates upward in amplitude, that output signal on a parallel connection 34 is fed back to the function error amplifier 24 to oppose the input signal at a summing junction. The output signal of the function generator then remains at a level indicative of desired until the elevator logic dictates otherwise.

The function generator output signal, designated as the output ramp, is fed on line 33 to the ramp switching circuit 36 which includes relay contacts which, depending upon which of the "up" and "down" relays 26 and 28 is energized, provides a control signal to one or the other input of an amplifier inverter stage 38. Depending on the condition of the "up-down" relay contacts in the ramp switching circuit 36, the inverter output signal will either be a positive ramp or a negative ramp.

Coupled directly to the three phase drive motor shaft is a two phase A.C. tachometer 61 which supplies both motor speed and motor direction information to the system. An output signal proportional to motor speed is obtained by rectifying and combining the two phase tachometer output, as is fully described in the aforedescribed copending application. This signal is positive for one direction of rotation of motor 60 and negative for the other direction of rotation. The polarity reversal is accomplished by the tachometer switching circuit 50. The tachometer feedback signal is fed to a summing junction, at the input to the error regulator amplifier

42.

The system can be best described in conjunction with an example. If the elevator is programmed to go up one floor by the elevator switching logic, that condition will produce a positive going ramp of a predetermined amplitude as the output on line 39 from the amplifier/inverter stage 38. This signal is fed to the summing junction at the input of the regulator amplifier 42. As was previously described, also fed to this same summing junction is a D.C. feedback signal on line 44 from the tachometer switching circuit. The polarity of the tachometer feedback signal is determined by the tachometer direction sensing circuit 48 and tachometer switching circuit 50, such that it will buck out the positive ramp on line 39 from inverter 38 when the elevator is programmed to go up. When the elevator is programmed to run the opposite direction, via the supervisory logic relays 26 and 28, and associated up or down relay switching contacts, the polarity of both of these signals is reversed and the tachometer signal will still buck out the ramp from inverter 38.

The difference signal from this summing process, which can be positive or negative, is amplified and inverted through the regulator amplifier 42. In all cases if the output signal from the regulator amplifier 42 is negative it is an effective up signal and if positive it is an effective down signal to the motor power controlling circuits. It should be noted that an up signal from the regulator 42 will not necessarily drive the elevator up, but can be a braking signal during a downward elevator drive. During a normal run the drive motor 60 might be receiving both up and down signals even though the elevator is moving in one direction. This provides the required control of the system.

A three-phase power source, through suitable circuit brakers and switches, provides A.C. drive power and, via transformers and rectifier circuits provides power and timing for the control system. The main lines for phases A, B and C, designated 62, 64 and 66, are connected through thyristor control and switching circuits to the three-phase input lines 68, 70 and 72 to motor 60. Each of at least two of the main lines, e.g., phases A and C, can be selectively connected to an associated pair of the three input lines to the three-phase motor 60, or can be reversely connected to the same pair of input lines to respectively provide drive or braking power in both directions of motor rotation.

The three phase A.C. input, via the transformers and full wave rectifier circuits, provides a regulated D.C. supply for the control system. Center tapped secondaries in transformer phases A and C provide cycle timing signals used by the thyristor trigger circuits, as will be further described.

Phase A, via power line 62, connects through dual inverse parallel thyristor control circuits 74 and 76 to respective motor input leads 68 and 72 and phase C, via line 66, connects through dual inverse parallel thyristor control circuits 78 and 80 to respective motor input leads 72 and 68. Each dual thyristor control circuit has two thyristors connected in parallel, but in opposed directions to enable controlled current flow in both directions, i.e., during each half cycle, if an appropriately timed trigger pulse is applied to the control electrode of the thyristor for that half cycle of that phase channel.

Circuit 74 includes inverse parallel thyristors 82 and 84 and is designated up control for phase A. Circuit 76 includes inverse parallel thyristors 86 and 88 and is designated the down control for phase A. Circuit 72 includes thyristors 90 and 92 in inverse parallel arrangement and is designated the up control for phase C. Circuit 80 includes thyristors 94 and 96 in inverse parallel arrangement and is designated the down control for phase C.

Each thyristor has trigger (or control) leads connected to associated trigger circuits, as will be more fully described hereinafter.

It is necessary to prevent both the up channel and the down channel in each of the phase A and phase C current supplies to both the A and C phase windings of the motor 60 from being turned on at the same time. If that were to happen, the three-phase input line currents would become excessively large, and possibly damage the thyristors in the up and down phase switching channels. To prevent that from happening, the motor drive or braking current is sensed by current transformers 100 and 102 in the up and down channel of one of input phases A or C. The sensed up or down current flow information is fed via a logic circuit 104 or 106, respectively, to associated safety lockout circuits 108 and 110 which operate to prevent turning on of the down channel while the up channel is turned on and vice versa.

The amplitude of the output signal from the error (or regulator) amplifier 42, the amplitude of which represents the variation in high or low motor speed relative to the desired speed is connected, via line 112, through directional diodes as inputs to one or the other of the lockout circuits 108 and 110 and thence, as permitted by one of the lockouts 108 or 110, to up trigger circuits 114 and 118 of down trigger circuits 116 and 120. A negative or up signal on input 112 provides a signal from the up lockout circuit 110, via its amplifier on parallel connection lines 122 and 124, to drive the two up channel trigger circuits 114 and 120 directly, while a positive or down signal from the regulator amplifier 42 to the down lockout 108 provides a signal on its output which must be inverted through inverter amplifier 128 and thence, via parallel connection lines 130 and 132, to drive the down channel trigger circuits 116 and 118.

Rectified signals from the up and down channel current transformers 100 (up) and 102 (down) ground any incoming signals to respective lockout circuits 108 (down) and 110 (up), so the function error signals on line 112 can have no effect on the signal lockout amplifier if current is sensed in the down channel and vice versa. Each of the lockout amplifiers when subjected to a signal output will provide an amplified output signal between fixed positive and negative levels which, in the exemplary control system, is selected as from +10V to −10V. When either circuit 108 or 110 is locked out, or the error signal on line 112 is zero, the respective amplifier of the circuit will transmit a maximum positive level signal, and for a full power error signal on line 112 (either full negative or full positive) the safety interlock output signal from the appropriate one or the other of amplifiers will be full negative. Adjustable resistors in the input circuits of respective interlock amplifiers enable adjustment of their outputs for a zero signal input.

The safety interlock down output is parallel connected via lines 130 and 132 to the two trigger circuits 116 and 120 of trigger boards 1 and 3 to drive in appropriate timed relationship to the phase cycles, the down thyristors (86 and 88) (94 and 96) in each channel of the respective A and C phase input lines to motor 60, to provide variable down power in two legs of the three-phase line power connection to the motor. Similarly, the safety interlock up output is parallel connected via lines 122 and 124 to the two trigger circuits 114 and 118 of trigger boards 2 and 4 to drive, in appropriate timed relationship to the phase cycles, the up thyristors (82 and 84) (90 and 92) in each channel of the respective A and C phase input lines to motor 60 to provide variable up power in two legs of the three-phase inputs to the motor.

The trigger circuits 118, 120, 116 and 114 of respective trigger boards 1, 2, 3 and 4 are identical and the boards are interchangeable. The circuit components are assembled on a printed circuit board with plug-in terminals. For convenience in drawing disclosure, boards 1, 2 and 3 are shown in block form and the trigger board circuit 114, which is the same as the circuit for all trigger boards, is disclosed in detail for trigger board 4 in FIG. 2. All boards have identical plug-in terminals and similar letter references are shown for comparison purposes on trigger boards 1, 2, 3 and 4. Terminals D, E, F, P, R and T are terminal connections to various voltage levels (as indicated on the drawing) from the power supply. Terminals N and V provide connections to selected phase channels for receiving cycle timing signals corresponding to the A.C. wave forms of the respective phases. Terminal J provides the connection for the input control signal (from the safety interlocks) to the trigger board. Terminals X and Y are isolated output terminals for one-half cycle thyristor triggering, while terminals C and B provide the isolated output circuit for the other half cycle triggering of the opposed thyristor in the associated up or down thyristor switching device for that phase channel.

Figure 3:
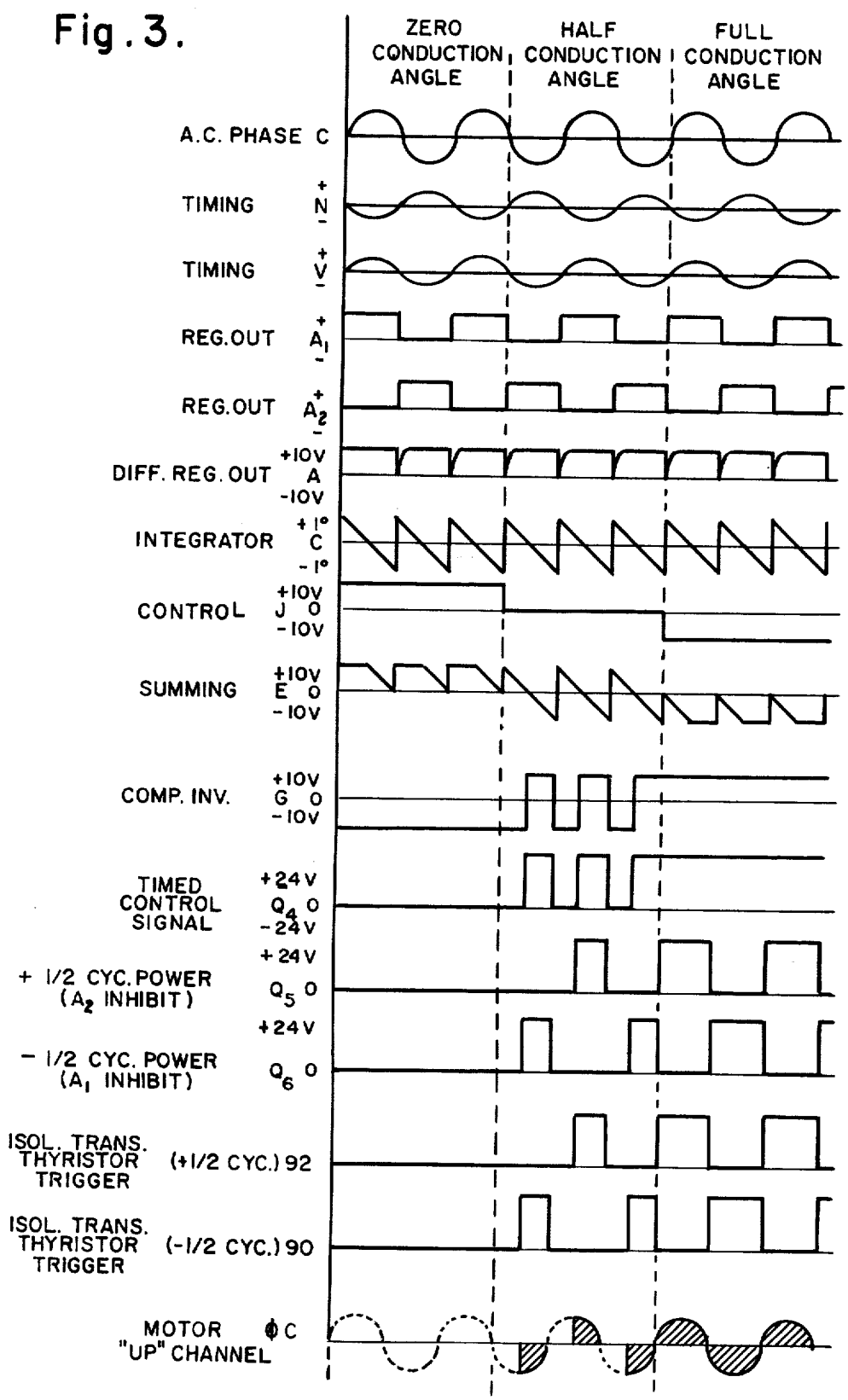
FIG. 3 is an exemplary wave form chart illustrating timed signals at various points in the trigger circuit.

A wave form timing chart for a trigger board is seen in FIG. 3. The voltage wave form at the top represents the sine wave for a specific A.C. phase channel applied to the thyristor switching device and to the primary windings of the power supply transformer corresponding to that phase. An associated center tap secondary for that phase transformer provides a pair of independent sine wave signals, 180° out of phase with each other, via connections to respective terminals N and V, the input timing terminals for a registor 160 (bi-stable multivibrator) on the trigger board.

Assuming an input signal on terminal N will set the registor, an appropriate input signal applied to terminal V will reset the register. Thus, every time a positive half cycle is applied to terminal N, the register will go to a set condition, its transistor Q1 will be turned on and its output junction A1 will go from positive to ground. Each time the cycle signal applied to terminal V gear positive, transistor Q2 is turned on and transistor Q1 is turned off, causing junction A2 to go from positive to ground and junction A1 to go from ground to positive.

Via differentiating capacitor-diode circuits 162 and 164, the negative going transitions appearing at junction A1 and A2 provide a signal wave form at junction A, having negative going timing spikes corresponding to the beginning of each half cycle of the associated A.C. phase. The negative going timing pulses at junction A are used to control an integrator reset circuit 166 which includes transistor Q3. Viewing FIGS. 2 and 3, each time a negative going spike appears at junction A, the integrator reset transistor Q3 is turned on and provides a positive voltage level (+10V) at junction C which resets the threshold voltage of integrator 168 at that positive level. The integrator integrates from +10 to −10 Volts during the time period for a half cycle. The amplified speed error control signal, from the up interlock circuit 108, which is transmitted on line 124 to terminal J, modifies the integrated saw tooth voltage output from integrator 168 at a summing junction E.

If the control signal applied to terminal J indicates a no power condition, a fully amplified positive signal (e.g., −10V in this specific case) from the safety interlock up circuit 110, that voltage level applied to summing junction E will keep integrated (saw tooth) voltage levels above ground level during the entire integrating period. Junction E is connected to the inverting input of an operational (high gain) amplifier 170 whose output has a range from negative (−10V) to positive (+10V). As long as the voltage signal at junction E is positive, the output of the comparator inverter 170 at junction G is at negative saturation, i.e., −10V. Whenever the signal level at junction E goes below zero to negative, the output of the comparator 170, junction G, goes full positive (+10V).

The wave form at the comparator output (junction G) is a square wave, the widths of the positive periods of which represent the desired conduction angle with the time correlated A.C. half cycles in the associated phase channel.

When the signal on input terminal J represents full power, (right hand portion of FIG. 3), in other words, it is at its −10V level, the effective integrated saw tooth wave form applied to comparator inverter 170 is negative during the entire integrating time period, causing the comparator 170 to provide a fixed positive level output for the entire half cycle time period.

Any intermediate signal level applied to terminal J of the trigger board will modify the saw-tooth wave form at the summing junction E to form somewhere between the full off and full on conditions shown in FIG. 3. The middle portion of the FIG. 3 chart shows an example of such an intermediate condition, a half conducting angle condition, wherein the (0) Volt control signal at terminal J causes a wave form at junction E which is negative during the last half of each half cycle. That negative input to the comparator 170 provides positive square waves on its output to junction G during the last half of each cycle period.

The square wave signals from the trigger circuit comparator 170 are applied through amplifier transistor Q4 and the resulting positive level signals on the emitter of Q4 are used to provide appropriately timed trigger signals to both of the inverse parallel thyristors in an associated thyristor switching device, e.g., device 76. The emitter of Q4 is connected to drive respective power amplifiers 172 (transistor Q5) and 174 (transistor Q6) via a parallel input circuit. Transistor Q5 is inhibited by an Inhibit Gate 176 whenever the junction $A_2$ is positive (during a negative half cycle of the associated A.C. phase) and transistor Q6 is inhibited by an Inhibit Gate 178 whenever the junction $A_1$ is positive (during a positive half cycle of the associated A.C. phase). Power transistor Q5 can only be turned on during one (positive) half cycle of the associated A.C. phase and is only turned on during the related period when the output transistor Q4 is on. Similarly, Power transistor Q6 can only be turned on during the other (negative) half cycle of the associated A.C. phase and is only turned on during the related period when the output transistor Q4 is on.

Figure 2:
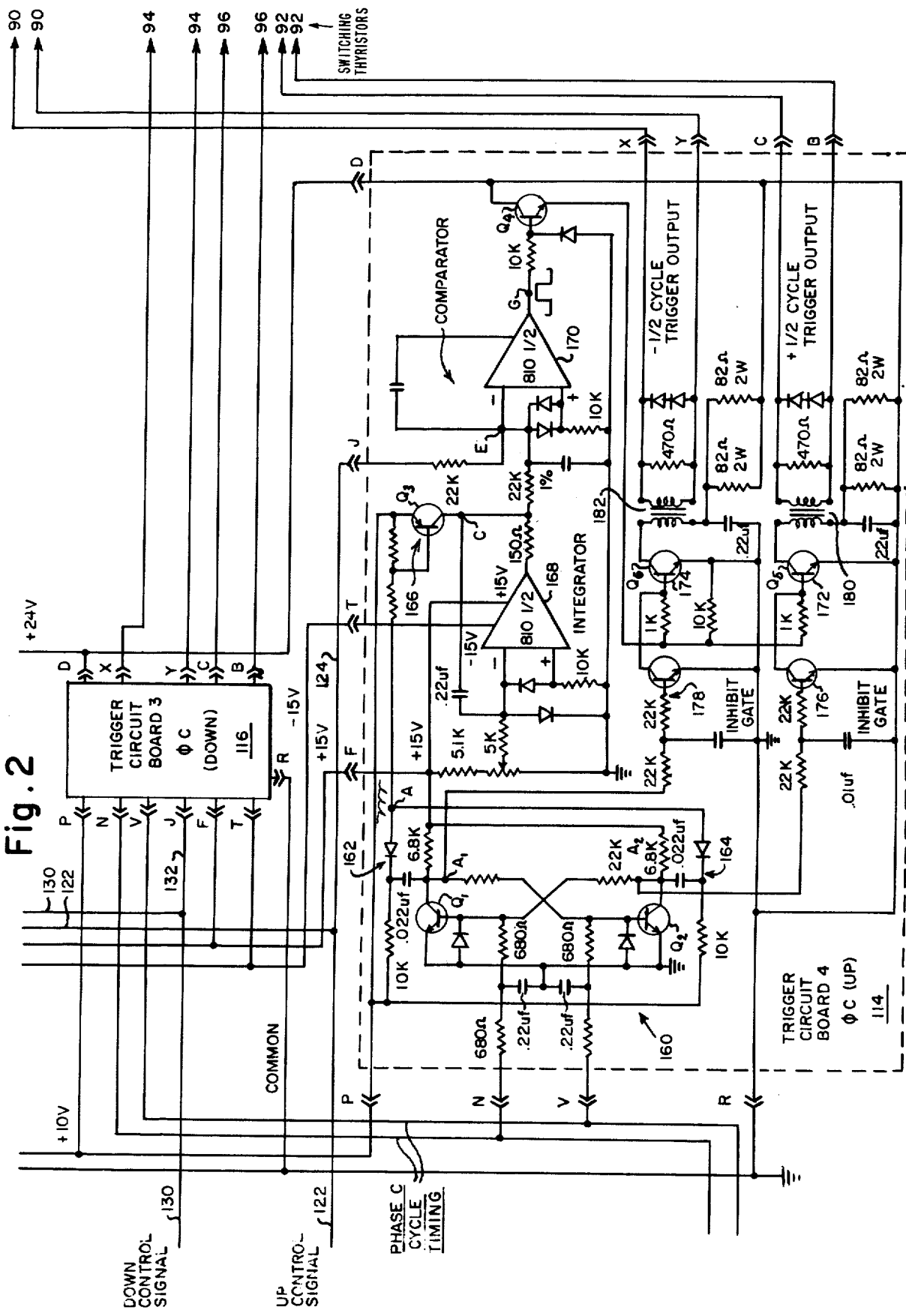
FIG. 2 is a schematic diagram of the preferred triggering circuit of the present invention.

As shown in FIG. 3, the outputs of power amplifiers 172 and 174 are square waves, the positive voltage levels of which occur for desired, controlled periods during associated half cycles and always terminate at the end of a half cycle. As shown in FIG. 2, the collector-emitter circuits of each power amplifier transistor Q5 and Q6 is series connected with the primary winding of an associated isolation square wave transformer. Q5 operates transformer 180 and Q6 operates transformer 182. The two leads of the secondary winding of transformer 180 connect through plug board terminals C and B to the trigger circuit of the half cycle (in the example, the positive half cycle) switching thyristor 92 and the two leads of the secondary winding of transformer 182 connect through plug board terminals x and y to the trigger circuit of the other of the half cycle (e.g., the negative half cycle) switching thyristor 90.

The isolation transformers 180 and 182 are square wave transformers and thus provide square wave trigger signals to turn on the associated thyristors 92 and 90 substantially instantaneously with the positive going transition of the isolation transformer output to its full positive voltage level, providing accurate control over desired conduction angle of the associated phase half cycle.

The foregoing trigger circuit description was made in connection with the up channel of phase C and shown how each half cycle of the A.C. phase wave in that channel will be controlled through its associated thyristor to provide a conduction angle determined by the output signal from the trigger board comparator 170, as driven by the control signal on the up interlock output lines 122 and 124. The same control signal is used to drive the phase A up trigger board circuit which, in accord with phase A cycle timing signals, will trigger the inversed parallel thyristor 82 and 84 of the phase A up channel thyristor switching device 74, at appropriate desired periods, within the positive and negative half cycles. If the interlock output control signal calls for down power the two down trigger board circuits 116 and 118 will trigger their associated thyristor devices in accord with associated phase cycle timing signals.

The various values of voltage resistance and capacitance in the described embodiment are exemplary of an operative circuit and can be changed in known manner by persons skilled in electrical circuitry and remain within the inventive concept.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A solid state trigger circuit to provide variable period output signals within a timed sequence of signals for controlling conduction angle firing of thyratron type switching devices in an A.C. phase line comprising:
    a bi-stable multivibrator with a first and a second input and a first and a second output which are coupled to form a third output;
    timing means providing successive timing signals derived from the alternating current in said phase line to be 180° out of phase with each other, said timing signals respectively being alternately applied to a corresponding one of said first and said second inputs of said multivibrator to oscillate said multivibrator at a desired timing rate, said first and said second outputs of said multivibrator providing a voltage transition spike at said third output at the beginning of each positive half cycle of said timing signals;
    means responsive to said voltage transition spike to provide a saw tooth wave form with periods corresponding to said timing rate; means providing a linear voltage input control signal indicative of a desired time period pulse width; and
    means comparing said control signal with said saw tooth wave form and providing corresponding square wave trigger output signals with signal pulse periods equal to said desired pulse width.

2. A trigger circuit as claimed in claim 1 further including a triggering output circuit which includes two branch circuits, one for each half cycle of said alternating current of said phase line; wherein said trigger output signals are applied to both of said branch circuits; each said branch circuit includes inhibit gates having inhibit inputs connected to respective different ones of said first and said second outputs of said multivibrator to inhibit transmission of said trigger output signals, alternatively, on said branch circuits, so that transmission occurs through one said branch circuit only when its related said half cycle is occurring in said phase line.

* * * * *